United States Patent
Filoti et al.

(10) Patent No.: US 11,461,672 B2
(45) Date of Patent: Oct. 4, 2022

(54) PLUG-AND-INGEST FRAMEWORK FOR QUESTION ANSWERING SYSTEMS

(71) Applicant: INTERNATIONAL BUSINESS MACHINES CORPORATION, Armonk, NY (US)

(72) Inventors: Octavian F. Filoti, Portsmouth, NH (US); Chengmin Ding, Chantilly, VA (US); Elinna Shek, Aldie, VA (US); Stanley J. Vernier, Grove City, OH (US); Renee F. Decker, Brunswick, MD (US); Daniel M. Jamrog, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 16/271,369

(22) Filed: Feb. 8, 2019

(65) Prior Publication Data
US 2020/0257990 A1    Aug. 13, 2020

(51) Int. Cl.
| | |
|---|---|
| *H04L 67/141* | (2022.01) |
| *G06Q 40/02* | (2012.01) |
| *H04L 47/21* | (2022.01) |
| *G06F 16/93* | (2019.01) |
| *G06N 5/02* | (2006.01) |
| *G06N 3/00* | (2006.01) |

(52) U.S. Cl.
CPC ............. *G06N 5/027* (2013.01); *G06F 16/93* (2019.01); *G06N 3/004* (2013.01)

(58) Field of Classification Search
CPC .......... G06N 5/027; G06N 3/004; G06N 5/00; G06F 16/93; G06F 16/3329; G06F 9/544; G06F 16/31; G06F 16/338

USPC ....................................................... 706/1–62
See application file for complete search history.

(56) References Cited

U.S. PATENT DOCUMENTS

| | | | |
|---|---|---|---|
| 6,977,930 B1 * | 12/2005 | Epps ...................... | H04L 47/10 370/392 |
| 9,563,846 B2 | 2/2017 | Allen et al. | |

(Continued)

OTHER PUBLICATIONS

Anonymously, "System and Method for a Dynamic Mashup of a Question Answering System with Integrated Internet Search," IP.com, IPCOM000236029D, Apr. 2, 2014, 3 pages.

(Continued)

*Primary Examiner* — Brandon S Cole
(74) *Attorney, Agent, or Firm* — Conley Rose, P.C.

(57) ABSTRACT

A system for question answering (QA) documents data ingestion decides to ingest the documents data through a first plurality of sub-pipelines including a first sub-pipeline having a first set of engines and a second sub-pipeline having a second set of engines being independent from the first set of engines. The system determines a subset of the documents data and decides to ingest the subset through a second plurality of sub-pipelines including a third sub-pipeline having a third set of engines and a fourth sub-pipeline having a fourth set of engines being independent from the third set of engines. A set of engines of the second plurality of sub-pipelines and a set of engines of the first plurality of sub-pipelines are in a common class. The system selects output data from the second plurality of sub-pipelines over corresponding output data from the first plurality of sub-pipelines and generates a knowledge base.

20 Claims, 5 Drawing Sheets

(56) References Cited

U.S. PATENT DOCUMENTS

| | | | |
|---|---|---|---|
| 9,684,726 B2 | 6/2017 | Jamrog et al. | |
| 9,697,099 B2 | 7/2017 | Dubbels et al. | |
| 10,114,872 B2* | 10/2018 | Chadha | G06F 16/9535 |
| 10,454,498 B1* | 10/2019 | Mao | H03M 7/42 |
| 11,294,924 B1* | 4/2022 | Talbot | G06F 16/252 |
| 2015/0356447 A1* | 12/2015 | Lowe | G06F 16/68 |
| | | | 706/47 |
| 2016/0110459 A1 | 4/2016 | Jamrog et al. | |
| 2016/0148114 A1* | 5/2016 | Allen | G06N 5/02 |
| | | | 706/11 |
| 2016/0283953 A1* | 9/2016 | Ettl | G06Q 10/06315 |
| 2016/0299956 A1 | 10/2016 | A. C. et al. | |
| 2016/0359894 A1* | 12/2016 | Andrejko | G06F 40/169 |
| 2017/0124475 A1* | 5/2017 | Anderson | G06N 5/045 |
| 2017/0139956 A1 | 5/2017 | Qiao et al. | |
| 2017/0213146 A1 | 7/2017 | Govindjee et al. | |
| 2018/0077183 A1* | 3/2018 | Swann | H04L 63/20 |
| 2018/0083975 A1* | 3/2018 | Byron | G06F 16/90332 |
| 2019/0196880 A1* | 6/2019 | Horiuchi | G06F 9/4881 |
| 2019/0384640 A1* | 12/2019 | Swamy | G06N 20/00 |
| 2020/0074999 A1* | 3/2020 | Elliott | G06F 16/9024 |
| 2020/0082015 A1* | 3/2020 | Watts | G06F 16/9024 |
| 2020/0258511 A1* | 8/2020 | Barkol | G10L 15/1815 |

OTHER PUBLICATIONS

Anonymously, "Intrepreting Complex Graphs for Optimal Ingestion," IP.com, IPCOM000241711D, May 26, 2015, 3 pages.
Anonymously, "Information Gap Prediction for Ingested Media," IP.com, IPCOM000241713D, May 26, 2015, 4 pages.
Jurafsky et al., "Question Answering," Speech and Language Processing, Chapter 28, Aug. 7, 2017, pp. 1-19.
Larson, et al., "Providing a Simple Question Answering System by Mapping Questions to Questions," 2017, pp. 1-15.
"Gobblin Architecture Overview," https://gobblin.readthedocs.is/en/latest/Gobblin-Architecture/, downloaded from the Internet Jan. 8, 2019, 10 pages.
"Commons Pipeline—Pipeline Basics," http://commons.apache.org/sandbox/commons-pipeline/pipeline_basics.html, downloaded from the Internet Sep. 28, 2018, 10 pages.
"Discovery Ingestion—Document Splitting Changes for the GA Solution," IBM Watson, Feb. 6, 2018, 16 pages.
"Inheritance in Java," https://www.javatpoint.com/inheritance-in-java, downloaded from the Internet Sep. 11, 2018, 8 pages.
"Java: Is a class a subclass of itself?," https://stackoverflow.com/questions/839569/java-is-a-class-a-subclass-of-itself, downloaded from the Internet Sep. 20, 2018, 5 pages.
"Microservices," Wikipedia, https://en.wikipedia.org/wiki/Microservices, downloaded from the Internet Oct. 11, 2018, 4 pages.
Foote, "Microservices 101: Changing the Monolithic Data Architecture Model," Dataversity, http://www.dataversity.net/microservices-101-changing-monolithic-data-architecture-model/, downloaded from the Internet Sep. 8, 2018, 3 pages.
Lewis, et al., "Microservices Resource Guide," https://martinfowler.com/microservices/, downloaded from the Internet Sep. 8, 2018, 17 pages.
"Monolithic System," Wikipedia, https://en.wikipedia.org/wiki/Monolithic_system, downloaded from the Internet Oct. 2, 2018, 1 page.
Devarajan, e al., "New Pricing for Watson Discovery Service," IBM Cloud Blog, https://www.ibm.com/blogs/bluemix/2017/06/new-pricing-watson-discovery-service/, downloaded from the Internet Jan. 11, 2019, 9 pages.
"Service API Versioning," Release Notes, IBM Cloud Docs, Discovery, https://console.bluemix.net/docs/services/discovery/release-notes.html#general-availability-release-15-december-2016, downloaded from the Internet, Jan. 11, 2019, 41 pages.
"Service API Versioning," Release Notes, IBM Cloud Docs, Discovery, https://console.bluemix.net/docs/services/discovery/release-notes.html#general-availability-release-15-december-2016, downloaded from the Internet Feb. 7, 2019, 43 pages.
"Watson (computer)," Wikipedia, https://en.wikipedia.org/wiki/Watson_(computer), downloaded from the Internet Sep. 6, 2018, 19 pages.
"WDS About," IBM Cloud Docs, Discovery, https://console.bluemix.net/docs/services/discovery/index.html#about, downloaded from the Internet Jan. 8, 2019, 3 pages.
"Getting Started with the API," IBM Cloud Docs, Discovery, https://console.bluemix.net/docs/services/discovery/getting-started . . . , downloaded from the Internet Jan. 8, 2019, 3 pages.
"Getting Started," IBM Cloud Docs, Discovery, https://cloud.ibm.com/docs/services/discovery/getting-started-tool.html#getting-started, downloaded from the Internet Feb. 7, 2019, 7 pages.
"IBM Cloud API Docs," IBM Cloud, https://cloud.ibm.com/apidocs/discovery, downloaded from the Internet Jan. 8, 2019, 146 gages.
"Watson Discovery Knowledge Graph," https://console.bluemix.net/docs/services/discovery/building-kg.ht . . . , downloaded from the Internet Jan. 8, 2019, 3 pages.
"Watson Discovery Service Functional Accessibility," 2017, 12 pages.
"Watson Discovery Services WDS Foundations Functions and Capabilities," 2017, 20 pages.
"Watson Discovery Service Introduction," 2017, 11 pages.
"What is Data Pipeline," https://northconcepts.com/docs/what-is-data-pipeline/, downloaded from the Internet Sep. 5, 2018, 5 pages.
"Pipeline (Computing)," Wikipedia, https://en.wikipedia.org/wiki/Pipeline_(computing), downloaded from the Internet Sep. 6, 2018, 4 pages.

* cited by examiner

PLUG-AND-INGEST FRAMEWORK FOR QUESTION ANSWERING SYSTEMS

BACKGROUND

A question answering (QA) system is, generally, a computer application which mines data stored in a knowledge base in order to answer questions. Building knowledge bases has involved ingesting large numbers of input documents through processing pipelines designed to extract useful information and derive useful relationships from the documents. The present disclosure provides various embodiments for document ingestion in a QA system such as, but not limited to, the Watson Discovery Advisor® QA system available from IBM®.

SUMMARY

A method for documents data ingestion in a QA system is disclosed. The method includes deciding to ingest the documents data through a first plurality of sub-pipelines including a first sub-pipeline having a first set of engines and a second sub-pipeline having a second set of engines. The second set of engines is independent from the first set of engines and is coupled to the first set of engines to receive data therefrom. The method also includes determining a first subset of the documents data. The method also includes deciding to ingest the first subset through a second plurality of sub-pipelines including a third sub-pipeline having a third set of engines and a fourth sub-pipeline having a fourth set of engines. The fourth set of engines is independent from the third set of engines and is coupled to the third set of engines to receive data therefrom. And at least one of the sets of engines of the second plurality of sub-pipelines and one of the sets of engines of the first plurality of sub-pipelines are members of a common class of engines. The method also includes selecting output data from the second plurality of sub-pipelines over corresponding output data from the first plurality of sub-pipelines, and generating a knowledge base based at least in part on the selected output data.

A system for QA documents data ingestion is disclosed. The system includes a memory having instructions therein and at least one processor in communication with the memory. The at least one processor is configured to execute the instructions to decide to ingest the documents data through a first plurality of sub-pipelines including a first sub-pipeline having a first set of engines and a second sub-pipeline having a second set of engines. The second set of engines is independent from the first set of engines and is coupled to the first set of engines to receive data therefrom. The at least one processor is also configured to execute the instructions to determine a first subset of the documents data and to decide to ingest the first subset through a second plurality of sub-pipelines including a third sub-pipeline having a third set of engines and a fourth sub-pipeline having a fourth set of engines. The fourth set of engines is independent from the third set of engines and is coupled to the third set of engines to receive data therefrom. And at least one of the sets of engines of the second plurality of sub-pipelines and one of the sets of engines of the first plurality of sub-pipelines are members of a common class of engines. The at least one processor is also configured to execute the instructions to select output data from the second plurality of sub-pipelines over corresponding output data from the first plurality of sub-pipelines, and to generate a knowledge base based at least in part on the selected output data.

A computer program product for documents data ingestion in a QA system is disclosed. The computer program product includes a computer readable storage medium having program instructions embodied therewith. The program instructions are executable by at least one processor to cause the at least one processor to decide to ingest the documents data through a first plurality of sub-pipelines including a first sub-pipeline having a first set of engines and a second sub-pipeline having a second set of engines. The second set of engines is independent from the first set of engines and is coupled to the first set of engines to receive data therefrom. The program instructions are also executable by the at least one processor to cause the at least one processor to determine a first subset of the documents data, and to decide to ingest the first subset through a second plurality of sub-pipelines including a third sub-pipeline having a third set of engines and a fourth sub-pipeline having a fourth set of engines. The fourth set of engines is independent from the third set of engines and is coupled to the third set of engines to receive data therefrom. And at least one of the sets of engines of the second plurality of sub-pipelines and one of the sets of engines of the first plurality of sub-pipelines are members of a common class of engines. The program instructions are also executable by the at least one processor to cause the at least one processor to select output data from the second plurality of sub-pipelines over corresponding output data from the first plurality of sub-pipelines, and to generate a knowledge base based at least in part on the selected output data.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry that is configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicates" means capable of sending and/or receiving data over a communication link. The communication link may include both wired and wireless links, and may be a direct link or may comprise of multiple links passing through one or more communication networks or network devices such as, but not limited to, routers, firewalls, servers, and switches. The communication networks may be any type of wired or wireless network. The networks may include private networks and/or public networks such as the Internet. Additionally, in certain embodiments, the term communicates may also encompass internal communication between various components of a system and/or with an external input/output device such as a keyboard or display device.

As used herein, the term "engine" means compiled code that performs one or more particular tasks to process its input data into output data within a sub-pipeline (described below). As referenced herein, a set (i.e., one or more) of engines "is dependent on" or "depends from" another set of engines when it is an extension of or extends (i.e., is in a common class with) that other set of engines such that it inherits the properties and behaviors of that other set of engines, conversely, a set of engines "is independent of," "is independent from," "is not dependent on," or "does not depend from" another set of engines when it is not an extension of or does not extend (i.e., is not in a common class with and does not inherit the properties and behaviors of) that other set of engines.

As used herein, the term "model" means the tools (e.g., dictionaries, schemas, properties files, and/or configuration files, etc.) from which an engine obtains configurable parameters and/or settings, if necessary, that the engine uses to process its input data into its output data.

As used herein, the term "sub-pipeline" means a microservice-like module that performs one or more particular tasks within a feature (described below) and that includes an engine and (if the engine obtains configurable parameters and/or settings from any model(s), the corresponding model(s) as well) or includes a plurality of engines and (if any of the engines obtain configurable parameters and/or settings from any model(s), the corresponding model(s)). As referenced herein, a sub-pipeline "is "dependent on," "depends from," "extends," or "is an extension of" another sub-pipeline when its set of engines is an extension of or extends the set of engines of that other sub-pipeline and, conversely, a sub-pipeline "is independent of," "is independent from," "is not dependent on," "does not depend from," "does not extend," or "is not an extension of" another sub-pipeline when its set of engines does not extend the set of engines of that other sub-pipeline.

As used herein, the term "feature" means a set of sub-pipelines that ingests document data records (described below) and processes data from the document data records into output data suitable for generating one or more components of a knowledge base. As referenced herein, a feature "is dependent on," "depends from," "extends," or "is an extension of" another feature when it includes a sub-pipeline that extends a sub-pipeline of that other feature and, conversely, a feature "is independent of," "is independent from," "is not dependent on," "does not depend from," "does not extend," or "is not an extension of" another feature when it does not include a sub-pipeline that extends a sub-pipeline of that other feature.

Figure 1:
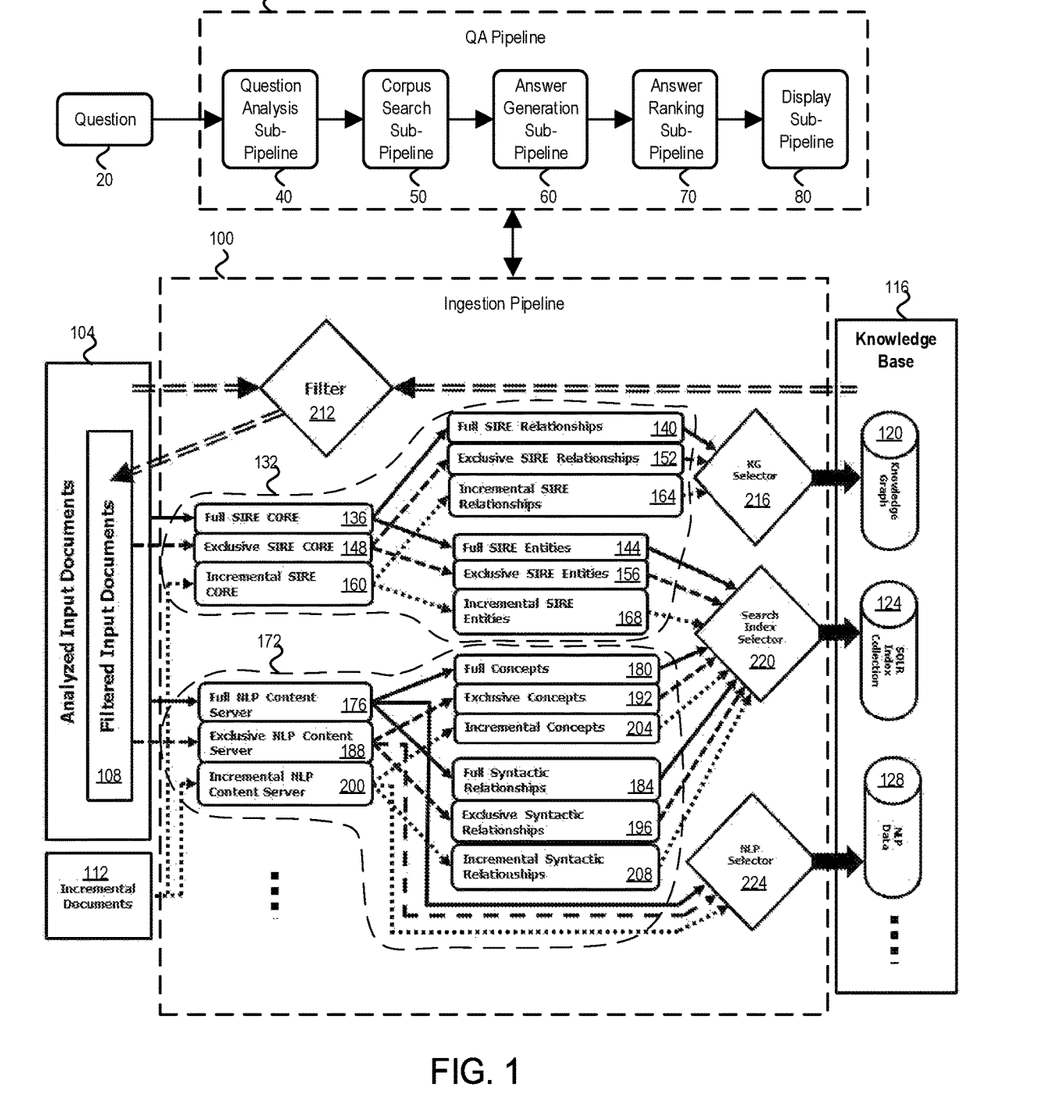
FIG. 1 is a schematic diagram illustrating a QA system in accordance with an embodiment of the present disclosure.

FIG. 1 is a schematic diagram illustrating a QA system 10 in accordance with an embodiment of the present disclosure. In the depicted example, the QA system 10 includes a QA pipeline 30 and an ingestion pipeline 100. The QA pipeline 30 is configured to mine a knowledge base 116 in order to provide an answer to a question 20. As described further below, the ingestion pipeline 100 is configured to provide data that may be used to generate one or more components of the knowledge base 116. In the depicted example, the QA pipeline 30 includes a question analysis sub-pipeline 40, a corpus search sub-pipeline 50, an answer generation sub-pipeline 60, an answer ranking sub-pipeline 70, and a display sub-pipeline 80.

The question analysis sub-pipeline 40 includes instructions for performing natural language processing (NLP), decomposition, shallow parses, deep parses, logical forms, semantic role labels, coreference, relations (e.g., subject-verb-object predicates or semantic relationships between entities), named entities, and so on, as well as specific kinds of analysis for question classification such as extracting the keynote words from the question. Question classification is the task of identifying question types or parts of questions that require special processing. In the depicted example, the QA system 10 is configured to use NLP to understand human speech.

The corpus search sub-pipeline 50 is configured to extract table annotations (e.g., annotation type, canonical name, or any auxiliary semantic value that was associated with the header or cell data) that correspond to the extracted keynote words or other data associated with the question 20. In the depicted example, the corpus search sub-pipeline 50 is also configured to use the table annotations metadata to returns possible matches.

The answer generation sub-pipeline 60 is configured to analyze the table annotations returned by the corpus search sub-pipeline 50 to identify one or more possible/candidate answers to the question 20.

The answer ranking sub-pipeline 70 is configured to rank the one or more candidate answers. The answer ranking sub-pipeline 70 may be configured to rank the candidate answers based on a plurality of scores associated with each candidate answer. For example, the IBM® Watson Discovery Advisor® QA system employs more than 50 scoring components that produce scores ranging from formal probabilities to counts to categorical features, based on evidence from different types of sources including unstructured text, semi-structured text, and triple stores. These scorers consider various factors including, but not limited to, the degree of match between a passage's predicate-argument structure and the question, passage source reliability, geospatial location, temporal relationships, taxonomic classification, the lexical and semantic relations the candidate is known to participate in, the candidate's correlation with question terms, its popularity (or obscurity), and its aliases. In the depicted example, the answer ranking sub-pipeline 70 is configured to identify a single best candidate answer to the question 20. In one embodiment, the answer ranking sub-pipeline 70 is configured to provide an estimate of its confidence (e.g., a confidence score/percentage) that the answer is correct.

The display sub-pipeline 80 is configured to display the answer, and optionally the confidence score. In some embodiments, the display sub-pipeline 80 is configured to convert the answer to speech for providing an audible answer to the question 20.

In the depicted example, the ingestion pipeline 100 is implemented in a Watson Discovery Advisor® QA system available from IBM®. Some other embodiments may be implemented in the Watson Discovery Advisor® QA system or other QA systems. As described further below, the ingestion pipeline 100 is configured to ingest analyzed input documents data 104, filtered input documents data 108, and/or incremental input documents data 112, and is configured to process the ingest analyzed input documents data 104, the filtered input documents data 108, and/or the incremental input documents data 112 into output data that may be used to generate one or more components of the knowledge base 116, such as a knowledge graph 120, a searching on Lucene with replication (SOLR) index collection 124, and/or natural language processing (NLP) data 128. In accordance with aspects of the present disclosure, the analyzed input documents data 104 comprises a plurality of document data records, each corresponding to a particular input document. The document data records may include text passages from their corresponding input documents and may include additional information such as metadata and other annotations that describe or otherwise relate to attributes of the corresponding input documents. The analyzed input documents data 104 has been previously cleaned, normalized, and/or otherwise analyzed and prepared for ingestion. The filtered input documents data 108 is a subset of the analyzed input documents data 104. The incremental input documents data 112 comprises a plurality of additional document data records (each corresponding to an additional input document) that may be processed into corresponding additional output data for generating one or more components of the knowledge base 116. As described further below, the ingestion pipeline 100 includes features (and sub-pipelines).

As used herein, the term "full" in reference to a sub-pipeline (e.g., full abc sub-pipeline, full ABC sub-pipeline, full efg sub-pipeline, full ABC efg sub-pipeline, etc.) indicates that the sub-pipeline so designated is configured to be included in a feature that is operable to ingest the analyzed input documents data 104 and processes data from the analyzed input documents data 104 into output data suitable for generating one or more components (e.g., knowledge graph 120, SOLR index collection 124, and/or NLP data 128) of the knowledge base 116. Also, used herein, the term "exclusive" in reference to a sub-pipeline (e.g., exclusive abc sub-pipeline, exclusive ABC sub-pipeline, exclusive efg sub-pipeline, exclusive ABC efg sub-pipeline, etc.) indicates that the sub-pipeline so designated is configured to be included in a feature that is operable to ingest the filtered input documents data 108 and processes data from the filtered input documents data 108 into output data suitable for generating one or more components of the knowledge base 116. And, as used herein, the term "incremental" in reference to a sub-pipeline indicates that the sub-pipeline so designated is configured to be included in a feature that is operable to ingest the incremental input documents data 112 and processes data from the incremental input documents data 112 into output data suitable for generating one or more components of the knowledge base 116. As described below in connection with FIG. 2 and FIG. 3, in accordance with aspects of the present disclosure either of two approaches may be employed to associate a particular full sub-pipeline, a corresponding exclusive sub-pipeline, and/or a corresponding incremental sub-pipeline. As described further below, corresponding full, exclusive, and incremental sub-pipelines of the ingestion pipeline 100 may be related to each other in either of the ways depicted in FIG. 2 and FIG. 3.

In the example depicted in FIG. 1, the ingestion pipeline 100 includes a Statistical Information and Relation Extraction (SIRE) feature 132. The SIRE feature 132 is configured to ingest the analyzed input documents data 104, the filtered input documents data 108, and/or the incremental input documents data 112 and to process it into statistical information data and relationship data for generating the knowledge graph 120 and the SOLR index collection 124 of the knowledge base 116. The SIRE feature 132 includes a full SIRE CORE sub-pipeline 136. The SIRE feature 132 further includes a full SIRE relationships sub-pipeline 140 and a full SIRE entities sub-pipeline 144. The full SIRE relationships sub-pipeline 140 and a full SIRE entities sub-pipeline 144 are coupled to and branch from the full SIRE CORE sub-pipeline 136 such that output data from the full SIRE CORE sub-pipeline 136 is input data to the full SIRE relationships sub-pipeline 140, and such that output data from the full SIRE CORE sub-pipeline 136 is input data to the full SIRE entities sub-pipeline 144. In accordance with aspects of the present disclosure, the full SIRE relationships sub-pipeline 140 is independent from the full SIRE CORE sub-pipeline 136, the full SIRE entities sub-pipeline 144 is independent from the full SIRE CORE sub-pipeline 136, and the full SIRE relationships sub-pipeline 140 is independent from the full SIRE entities sub-pipeline 144.

The example SIRE feature 132 further includes an exclusive SIRE CORE sub-pipeline 148, an exclusive SIRE relationships sub-pipeline 152, and an exclusive SIRE entities sub-pipeline 156. The exclusive SIRE relationships sub-pipeline 152 and the exclusive SIRE entities sub-pipeline 156 are coupled to and branch from the exclusive SIRE CORE sub-pipeline 148 such that output data from the exclusive SIRE CORE sub-pipeline 148 is input data to the exclusive SIRE relationships sub-pipeline 152, and such that output data from the exclusive SIRE CORE sub-pipeline 148 is input data to the exclusive SIRE entities sub-pipeline 156. In accordance with aspects of the present disclosure, the exclusive SIRE relationships sub-pipeline 152 is independent from the exclusive SIRE CORE sub-pipeline 148, the exclusive SIRE entities sub-pipeline 156 is independent from the exclusive SIRE CORE sub-pipeline 148, and the exclusive SIRE relationships sub-pipeline 152 is independent from the exclusive SIRE entities sub-pipeline 156. Also, the exclusive SIRE CORE sub-pipeline 148 extends the full SIRE CORE sub-pipeline 136 in a manner like that described in further detail below in connection with the representative sub-pipelines illustrated in FIG. 2. The exclusive SIRE relationships sub-pipeline 152 extends the full SIRE relationships sub-pipeline 140 in a manner like that described in further detail below in connection with the representative sub-pipelines illustrated in FIG. 2. And the exclusive SIRE entities sub-pipeline 156 extends the full SIRE entities sub-pipeline 144 in a manner like that described in further detail below in connection with the representative sub-pipelines illustrated in FIG. 2. In some other embodiments, the exclusive SIRE CORE sub-pipeline 148 and the full SIRE CORE sub-pipeline 136 each extend an abstract SIRE CORE sub-pipeline in a manner like that described in further detail below in connection with the representative sub-pipelines illustrated in FIG. 3. In some other embodiments, the exclusive SIRE relationships sub-pipeline 152 and the full SIRE relationships sub-pipeline 140 each extend an abstract SIRE relationships sub-pipeline in a manner like that described in further detail below in connection with the representative sub-pipelines illustrated in FIG. 3. And in some other embodiments the exclusive SIRE entities sub-pipeline 156 and the full SIRE entities sub-pipeline 144 each extend an abstract SIRE entities sub-pipeline in a manner like that described in further detail below in connection with the representative sub-pipelines illustrated in FIG. 3. In some other embodiments, one or more of the sub-pipeline extensions are implemented in a manner like that described in connection with FIG. 2, while one or more of the other sub-pipeline extensions are implemented in a manner like that described in connection with FIG. 3.

The example SIRE feature 132 further includes an incremental SIRE CORE sub-pipeline 160, an incremental SIRE relationships sub-pipeline 164, and an incremental SIRE entities sub-pipeline 168. The incremental SIRE relationships sub-pipeline 164 and the incremental SIRE entities sub-pipeline 168 are coupled to and branch from the incremental SIRE CORE sub-pipeline 160 such that output data from the incremental SIRE CORE sub-pipeline 160 is input data to the incremental SIRE relationships sub-pipeline 164, and such that output data from the incremental SIRE CORE sub-pipeline 160 is input data to the incremental SIRE entities sub-pipeline 168. In accordance with aspects of the present disclosure, the incremental SIRE relationships sub-pipeline 164 is independent from the incremental SIRE CORE sub-pipeline 160, the incremental SIRE entities sub-pipeline 168 is independent from the incremental SIRE CORE sub-pipeline 160, and the incremental SIRE relationships sub-pipeline 164 is independent from the incremental SIRE entities sub-pipeline 168. Further, the incremental SIRE CORE sub-pipeline 160 extends the exclusive SIRE CORE sub-pipeline 148 in a manner like that described in further detail below in connection with the representative sub-pipelines illustrated in FIG. 2. Also, the incremental SIRE relationships sub-pipeline 164 extends the exclusive SIRE relationships sub-pipeline 152 in a manner like that described in further detail below in connection with the representative sub-pipelines illustrated in FIG. 2. And the incremental SIRE entities sub-pipeline 168 extends the exclusive SIRE entities sub-pipeline 156 in a manner like that described in further detail below in connection with the representative sub-pipelines illustrated in FIG. 2. In some other embodiments, the incremental SIRE CORE sub-pipeline 160 and the exclusive SIRE CORE sub-pipeline 148 (and the full SIRE CORE sub-pipeline 136) each extend an abstract SIRE CORE sub-pipeline in a manner like that described in further detail below in connection with the representative sub-pipelines illustrated in FIG. 3. In some other embodiments, the incremental SIRE relationships sub-pipeline 164 and the exclusive SIRE relationships sub-pipeline 152 (and the full SIRE relationships sub-pipeline 140) each extend an abstract SIRE relationships sub-pipeline in a manner like that described in further detail below in connection with the representative sub-pipelines illustrated in FIG. 3. And in some other embodiments the incremental SIRE entities sub-pipeline 168 and the exclusive SIRE entities sub-pipeline 156 (and the full SIRE entities sub-pipeline 144) each extend an abstract SIRE entities sub-pipeline in a manner like that described in further detail below in connection with the representative sub-pipelines illustrated in FIG. 3. In some other embodiments, one or more of the sub-pipeline extensions are implemented in a manner like that described in connection with FIG. 2, while one or more of the other sub-pipeline extensions are implemented in a manner like that described in connection with FIG. 3.

The example ingestion pipeline 100 further includes an NLP feature 172. The NLP feature 172 is independent from the SIRE feature 132. The NLP feature 172 is configured to ingest analyzed input documents data 104, filtered input documents data 108, and/or incremental input documents data 112 and to process the analyzed input documents data 104, filtered input documents data 108, and/or incremental input documents data 112 into data for generating the SOLR index collection 124 and the NLP data 128 of the knowledge base 116. The NLP feature 172 includes a full NLP content server sub-pipeline 176, a full concepts sub-pipeline 180 and a full syntactic relationships sub-pipeline 184. The full concepts sub-pipeline 180 and the full syntactic relationships sub-pipeline 184 are coupled to and branch from the full NLP content server sub-pipeline 176 such that output data from the full NLP content server sub-pipeline 176 is input data to the full concepts sub-pipeline 180, and such that output data from the full NLP content server sub-pipeline 176 is input data to the full syntactic relationships sub-pipeline 184. In accordance with aspects of the present disclosure, the full concepts sub-pipeline 180 is independent from the full NLP content server sub-pipeline 176, the full syntactic relationships sub-pipeline 184 is independent from the full NLP content server sub-pipeline 176, and the full concepts sub-pipeline 180 is independent from the full syntactic relationships sub-pipeline 184.

In the depicted example, the NLP feature 172 further includes an exclusive NLP content server sub-pipeline 188, an exclusive concepts sub-pipeline 192, and an exclusive syntactic relationships sub-pipeline 196. The exclusive concepts sub-pipeline 192 and the exclusive syntactic relationships sub-pipeline 196 are coupled to and branch from the exclusive NLP content server sub-pipeline 188 such that output data from the exclusive NLP content server sub-pipeline 188 is input data to the exclusive concepts sub-pipeline 192, and such that output data from the exclusive NLP content server sub-pipeline 188 is input data to the exclusive syntactic relationships sub-pipeline 196. In accordance with aspects of the present disclosure, the exclusive concepts sub-pipeline 192 is independent from the exclusive NLP content server sub-pipeline 188, the exclusive syntactic relationships sub-pipeline 196 is independent from the exclusive NLP content server sub-pipeline 188, and the exclusive concepts sub-pipeline 192 is independent from the exclusive syntactic relationships sub-pipeline 196. Further, the exclusive NLP content server sub-pipeline 188 extends the full NLP content server sub-pipeline 176 in a manner like that described in further detail below in connection with the representative sub-pipelines illustrated in FIG. 2. Also, the exclusive concepts sub-pipeline 192 extends the full concepts sub-pipeline 180 in a manner like that described in further detail below in connection with the representative sub-pipelines illustrated in FIG. 2. And the exclusive syntactic relationships sub-pipeline 196 extends the full syntactic relationships sub-pipeline 184 in a manner like that described in further detail below in connection with the representative sub-pipelines illustrated in FIG. 2. In some other embodiments, the exclusive NLP content server sub-pipeline 188 and the full NLP content server sub-pipeline 176 each extend an abstract NLP content server sub-pipeline in a manner like that described in further detail below in connection with the representative sub-pipelines illustrated in FIG. 3. In some other embodiments, the exclusive concepts sub-pipeline 192 and the full concepts sub-pipeline 180 each extend an abstract concepts sub-pipeline in a manner like that described in further detail below in connection with the representative sub-pipelines illustrated in FIG. 3. And in some other embodiments, the exclusive syntactic relationships sub-pipeline 196 and the full syntactic relationships sub-pipeline 184 each extend an abstract syntactic relationships sub-pipeline in a manner like that described in further detail below in connection with the representative sub-pipelines illustrated in FIG. 3. In some other embodiments, one or more of the sub-pipeline extensions are implemented in a manner like that described in connection with FIG. 2, while one or more of the other sub-pipeline extensions are implemented in a manner like that described in connection with FIG. 3.

The example NLP feature 172 also includes an incremental NLP content server sub-pipeline 200, an incremental concepts sub-pipeline 204, and an incremental syntactic relationships sub-pipeline 208. The an incremental concepts sub-pipeline 204 and the incremental syntactic relationships sub-pipeline 208 are coupled to and branch from the incremental NLP content server sub-pipeline 200 such that output data from the incremental NLP content server sub-pipeline 200 is input data to the incremental concepts sub-pipeline 204, and such that output data from the incremental NLP content server sub-pipeline 200 is input data to the incremental syntactic relationships sub-pipeline 208. In accordance with aspects of the present disclosure, the incremental concepts sub-pipeline 204 is independent from the incremental NLP content server sub-pipeline 200, the incremental syntactic relationships sub-pipeline 208 is independent from the incremental NLP content server sub-pipeline 200, and the incremental concepts sub-pipeline 204 is independent from the incremental syntactic relationships sub-pipeline 208. Further, the incremental NLP content server sub-pipeline 200 extends the exclusive NLP content server sub-pipeline 188 in a manner like that described in further detail below in connection with the representative sub-pipelines illustrated in FIG. 2. The incremental concepts sub-pipeline 204 extends the exclusive concepts sub-pipeline 192 in a manner like that described in further detail below in connection with the representative sub-pipelines illustrated in FIG. 2. And the incremental syntactic relationships sub-pipeline 208 extends the exclusive syntactic relationships sub-pipeline 196 in a manner like that described in further detail below in connection with the representative sub-pipelines illustrated in FIG. 2. In some other embodiments, the incremental NLP content server sub-pipeline 200 and the exclusive NLP content server sub-pipeline 188 (and the full NLP content server sub-pipeline 176) each extend an abstract NLP content server sub-pipeline in a manner like that described in further detail below in connection with the representative sub-pipelines illustrated in FIG. 3. In some other embodiments, the incremental concepts sub-pipeline 204 and the exclusive concepts sub-pipeline 192 (and the full concepts sub-pipeline 180) each extend an abstract concepts sub-pipeline in a manner like that described in further detail below in connection with the representative sub-pipelines illustrated in FIG. 3. And in some other embodiments, the incremental syntactic relationships sub-pipeline 208 and the full syntactic relationships sub-pipeline 196 (and the full syntactic relationships sub-pipeline 184) each extend an abstract syntactic relationships sub-pipeline in a manner like that described in further detail below in connection with the representative sub-pipelines illustrated in FIG. 3. In some other embodiments, one or more of the sub-pipeline extensions are implemented in a manner like that described in connection with FIG. 2, while one or more of the other sub-pipeline extensions are implemented in a manner like that described in connection with FIG. 3.

The example ingestion pipeline 100 further includes a sub-pipeline input filter module 212 and/or one or more other sub-pipeline input filter modules (not shown) that are configured to monitor the analyzed input documents data 104, the knowledge base 116, and each sub-pipeline model included in the ingestion pipeline 100 for changes, and that are configured to apply FILTERING RULES (described below) to determine what document data records the ingestion pipeline 100 is to ingest into/through each of the sub-pipelines of the ingestion pipeline 100. The sub-pipeline input filter module 212 and/or one or more other sub-pipeline input filter modules are also configured to generate and update descriptor data that catalogs what document data records the ingestion pipeline 100 is to ingest into/through each of the sub-pipelines of the ingestion pipeline 100 according to the FILTERING RULES (described below).

As used herein, the term "Full Ingestion" means any ingestion of any of the analyzed input documents data 104 through full sub-pipelines of the ingestion pipeline 100, the term "Exclusive Ingestion" means any ingestion of any of the filtered input documents data 108 through exclusive sub-pipelines of the ingestion pipeline 100, and the term "Incremental Ingestion" means any ingestion of any of the incremental input documents data 112 through incremental sub-pipelines of the ingestion pipeline 100.

In accordance with aspects of the present disclosure, the FILTERING RULES are as follows:

FILTERING RULE No. 1: Upon initialization (e.g., first operation or hard reset/reboot) determine that the ingestion pipeline 100 is to perform a Full Ingestion of the analyzed input documents data 104 through full sub-pipelines of the ingestion pipeline 100.

FILTERING RULE No. 2: In response to a request (e.g., from a user of the QA system 10) for an ingestion of the analyzed input documents data 104, determine that the ingestion pipeline 100 is to perform a Full Ingestion of the analyzed input documents data 104 through full sub-pipelines of the ingestion pipeline 100.

FILTERING RULE No. 3: In response to a change (e.g., by a user of the QA system 10) to the analyzed input documents data 104 and/or a change (e.g., by a developer) to the document data records required to generate the knowledge base 116, compare time stamps, checksums, and/or other attributes of the previous version of the analyzed input documents data 104 to corresponding attributes of the new/updated version of the analyzed input documents data 104 and compare the previous requirements for generating the knowledge base 116 with the new/updated requirements, respectively, to determine what subset of the analyzed input documents data 104 has changed (and has not been ingested since it has been changed), and deem/identify that subset of the analyzed input documents data 104 to be the filtered input documents data 108.

FILTERING RULE No. 4: In response to a change (e.g., by a developer) to one or more sub-pipeline models included in the ingestion pipeline 100, compare each new/updated sub-pipeline model with its previous version to determine the subset of the sub-pipeline input data (that has been received by the sub-pipeline which includes the sub-pipeline model) that would materially change the sub-pipeline output data (from the sub-pipeline which includes the sub-pipeline model) if re-ingested using the new/updated sub-pipeline model, and add that subset of the sub-pipeline input data to the filtered input documents data 108.

FILTERING RULE No. 5: If the amount of the filtered input documents data 108 is greater than a user-specifiable threshold ("THRESHOLD") that has been specified by a user of the QA system 10, then determine that the ingestion pipeline 100 is to perform a Full Ingestion of the analyzed input documents data 104 through full sub-pipelines of the ingestion pipeline 100; otherwise; determine that the ingestion pipeline 100 is to perform an Exclusive Ingestion of the filtered input documents data 108 through exclusive sub-pipelines of the ingestion pipeline 100.

FILTERING RULE No. 6: In response to a request (e.g., from a user of the QA system 10) for an ingestion of the incremental input documents data 112, determine that the ingestion pipeline 100 is to perform an "Incremental Ingestion" of the incremental input documents data 112 through incremental sub-pipelines of the ingestion pipeline 100.

The example ingestion pipeline 100 further includes a knowledge graph output selector module 216. The knowledge graph output selector module 216 is coupled to the full SIRE relationships sub-pipeline 140, coupled to the exclusive SIRE relationships sub-pipeline 152, and coupled to the incremental SIRE relationships sub-pipeline 164 such that output data from the full SIRE relationships sub-pipeline 140 is input data to the knowledge graph output selector module 216, such that output data from the exclusive SIRE relationships sub-pipeline 152 is input data to the knowledge graph output selector module 216, and such that output data from the incremental SIRE relationships sub-pipeline 164 is input data to the knowledge graph output selector module 216.

The example ingestion pipeline 100 also includes a search index output selector module 220. The search index output selector module 220 is coupled to the full SIRE entities sub-pipeline 144, coupled to the exclusive SIRE entities sub-pipeline 156, and coupled to the incremental SIRE entities sub-pipeline 168 such that output data from the full SIRE entities sub-pipeline 144 is input data to the search index output selector module 220, such that output data from the exclusive SIRE entities sub-pipeline 156 is input data to the search index output selector module 220, and such that output data from the incremental SIRE entities sub-pipeline 168 is input data to the search index output selector module 220. The search index output selector module 220 is also coupled to the full concepts sub-pipeline 180, coupled to the exclusive concepts sub-pipeline 192, and coupled to the incremental concepts sub-pipeline 204 such that output data from the full concepts sub-pipeline 180 is input data to the search index output selector module 220, such that output data from the exclusive concepts sub-pipeline 192 is input data to the search index output selector module 220, and such that output data from the incremental concepts sub-pipeline 204 is input data to the search index output selector module 220. The search index output selector module 220 is also coupled to the full syntactic relationships sub-pipeline 184, coupled to the exclusive syntactic relationships sub-pipeline 196, and coupled to the incremental syntactic relationships sub-pipeline 208 such that output data from the full syntactic relationships sub-pipeline 184 is input data to the search index output selector module 220, such that output data from the exclusive syntactic relationships sub-pipeline 196 is input data to the search index output selector module 220, and such that output data from the incremental syntactic relationships sub-pipeline 208 is input data to the search index output selector module 220.

In the depicted example, the ingestion pipeline 100 also includes an NLP output selector module 224. The NLP output selector module 224 is coupled to the full NLP content server sub-pipeline 176, coupled to the exclusive NLP content server sub-pipeline 188, and coupled to the incremental NLP content server sub-pipeline 200 such that output data from the full NLP content server sub-pipeline 176 is input data to the NLP output selector module 224, such that output data from the exclusive NLP content server sub-pipeline 188 is input data to the NLP output selector module 224, and such that output data from the incremental NLP content server sub-pipeline 200 is input data to the NLP output selector module 224.

In the example depicted in FIG. 1, in which the exclusive sub-pipelines extend the corresponding full sub-pipelines in a manner like that described in further detail below in connection with the representative sub-pipelines illustrated in FIG. 2, the knowledge graph output selector module 216, the search index output selector module 220, and the NLP output selector module 224 are each configured to read the descriptor data generated/updated by the sub-pipeline input filter module 212 and/or the other sub-pipeline input filter module(s), and are each configured to select, store, and catalog document data records from their respective input data (and to update the descriptor data) according to the following SELECTION RULES:

SELECTION RULE No. 1: Select all document data records received from each full sub-pipeline, except as SELECTION RULE No. 2A dictates otherwise.

SELECTION RULE No. 2A: Select any document data records received from each exclusive sub-pipeline over any document data records from the corresponding full sub-pipeline which that exclusive sub-pipeline extends.

SELECTION RULE No. 3: Select any document data records received from each incremental sub-pipeline in addition to the other selected document data records.

SELECTION RULE No. 4: Deselect the previously selected document data records that were received from any feature(s) that have been (e.g., by a developer) newly changed/updated or newly disabled/removed.

In some other embodiments, in which the full sub-pipelines and the corresponding exclusive sub-pipelines extend abstract sub-pipelines in a manner like that described in further detail below in connection with the representative sub-pipelines illustrated in FIG. 3, the knowledge graph output selector module 216, the search index output selector module 220, and the NLP output selector module 224 are each configured to read the descriptor data generated/updated by the sub-pipeline input filter module 212 and/or the other sub-pipeline input filter module(s), and are each configured to select, store, and catalog document data records from their respective input data (and to update the descriptor data) according to the SELECTION RULE No. 1 (above), the SELECTION RULE No. 3 (above), the SELECTION RULE No. 4 (above), and the following:

SELECTION RULE No. 2B: Select any document data records received from each exclusive sub-pipeline over any document data records from the corresponding full sub-pipeline that extends the same abstract sub-pipeline which that exclusive sub-pipeline extends.

It is noted that the above-described features and sub-pipelines are merely examples. In other embodiments, the ingestion pipeline 100 may include (in addition to or in lieu of the above-described features and sub-pipelines) one or more other mutually independent features comprising one or other mutually independent full sub-pipelines along with one or more other corresponding mutually independent exclusive sub-pipelines and/or one or more other corresponding mutually independent incremental sub-pipelines.

Figure 2:
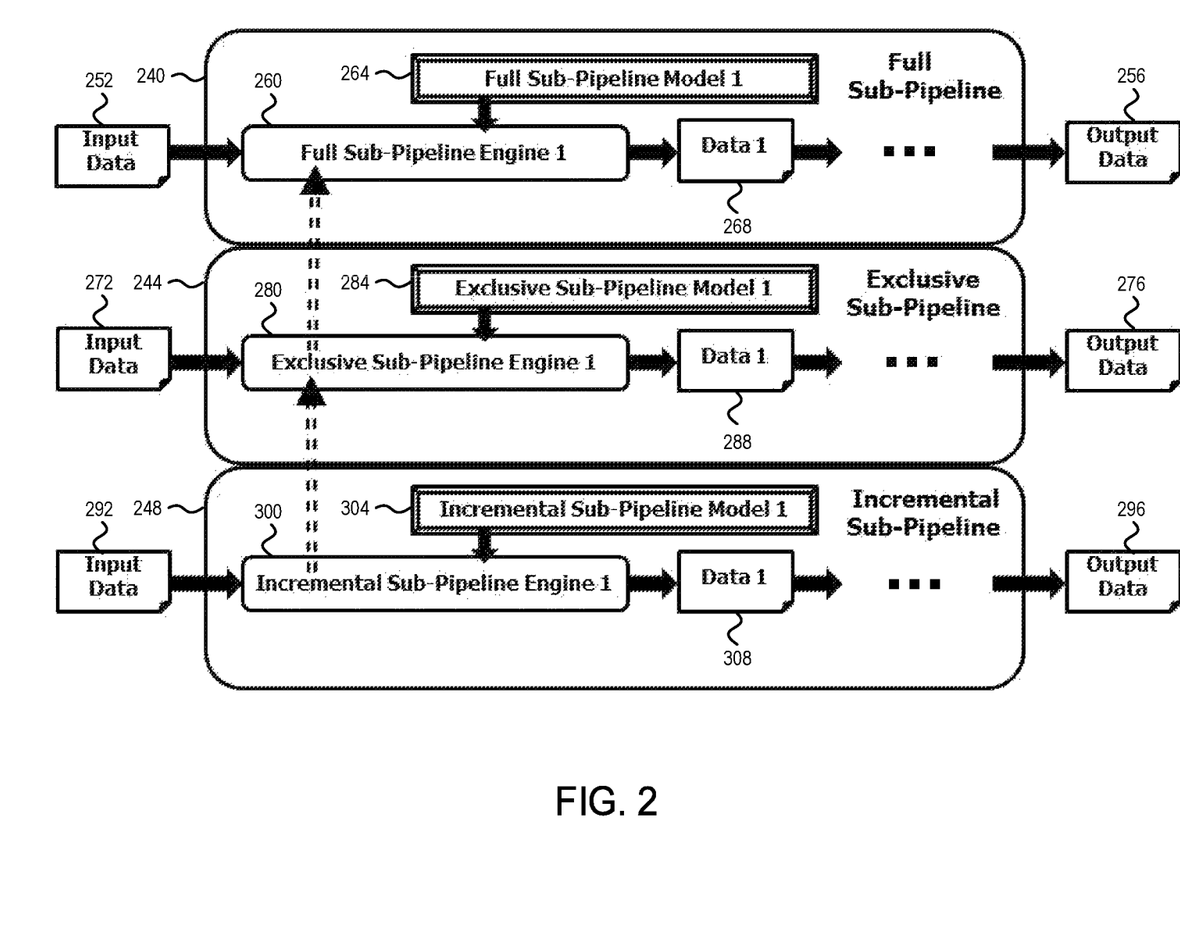
FIG. 2 is a schematic diagram illustrating a representative full sub-pipeline, a representative exclusive sub-pipeline that extends the representative full sub-pipeline, and a representative incremental sub-pipeline that extends the representative exclusive sub-pipeline, in accordance with an embodiment of the present disclosure.

FIG. 2 is a schematic diagram illustrating a representative full sub-pipeline 240, a representative exclusive sub-pipeline 244 that extends the representative full sub-pipeline 240, and a representative incremental sub-pipeline 248 that extends the representative exclusive sub-pipeline 240, in accordance with an embodiment of the present disclosure. In the depicted example, the full sub-pipeline 240 is configured to receive full sub-pipeline input data 252 and to process the full sub-pipeline input data 252 into full sub-pipeline output data 256. Further, in the depicted example, the full sub-pipeline 240 includes a full sub-pipeline engine 260 and a full sub-pipeline model 264. In the depicted example, the full sub-pipeline engine 260 is configured to use the full sub-pipeline model 264 and processing rules to process the full sub-pipeline input data 252 into full sub-pipeline engine output data 268. In the depicted example, the full sub-pipeline 240 outputs the full sub-pipeline engine output data 268 as the full sub-pipeline output data 256. In some other embodiments, the full sub-pipeline 240 includes a plurality of engines and their respective models, with the engines coupled in series, and the full sub-pipeline 240 outputs the output data from the last engine of the series as the full sub-pipeline output data 256.

In the depicted example, the exclusive sub-pipeline 244 is configured to receive exclusive sub-pipeline input data 272 and to process the exclusive sub-pipeline input data 272 into exclusive sub-pipeline output data 276. Further, in the depicted example, the exclusive sub-pipeline 244 includes an exclusive sub-pipeline engine 280 and an exclusive sub-pipeline model 284. In the depicted example, the exclusive sub-pipeline engine 280 is configured to use the exclusive sub-pipeline model 284 and processing rules to process the exclusive sub-pipeline input data 272 into exclusive sub-pipeline engine output data 288. Further, in the depicted example the exclusive sub-pipeline engine 280 is an extension of the full sub-pipeline engine 260. In the depicted example, the exclusive sub-pipeline 244 outputs the exclusive sub-pipeline engine output data 288 as the exclusive sub-pipeline output data 276. In some other embodiments, the exclusive sub-pipeline 244 includes a plurality of engines and their respective models, with the engines coupled in series, and the exclusive sub-pipeline 244 outputs the output data from the last engine of the series as the exclusive sub-pipeline output data 276.

In the depicted example, the incremental sub-pipeline 248 is configured to receive incremental sub-pipeline input data 292 and to process the incremental sub-pipeline input data 292 into incremental sub-pipeline output data 296. Further, in the depicted example, the incremental sub-pipeline 248 includes an incremental sub-pipeline engine 300 and an incremental sub-pipeline model 304. In the depicted example, the incremental sub-pipeline engine 300 is configured to use the incremental sub-pipeline model 304 and processing rules to process the incremental sub-pipeline input data 292 into incremental sub-pipeline engine output data 308. Further, in the depicted example the incremental sub-pipeline engine 300 is an extension of the exclusive sub-pipeline engine 280. In the depicted example, the incremental sub-pipeline 248 outputs the incremental sub-pipeline engine output data 308 as the incremental sub-pipeline output data 296. In some other embodiments, the incremental sub-pipeline 248 includes a plurality of engines and their respective models, with the engines coupled in series, and the incremental sub-pipeline 248 outputs the output data from the last engine of the series as the incremental sub-pipeline output data 296.

Figure 3:
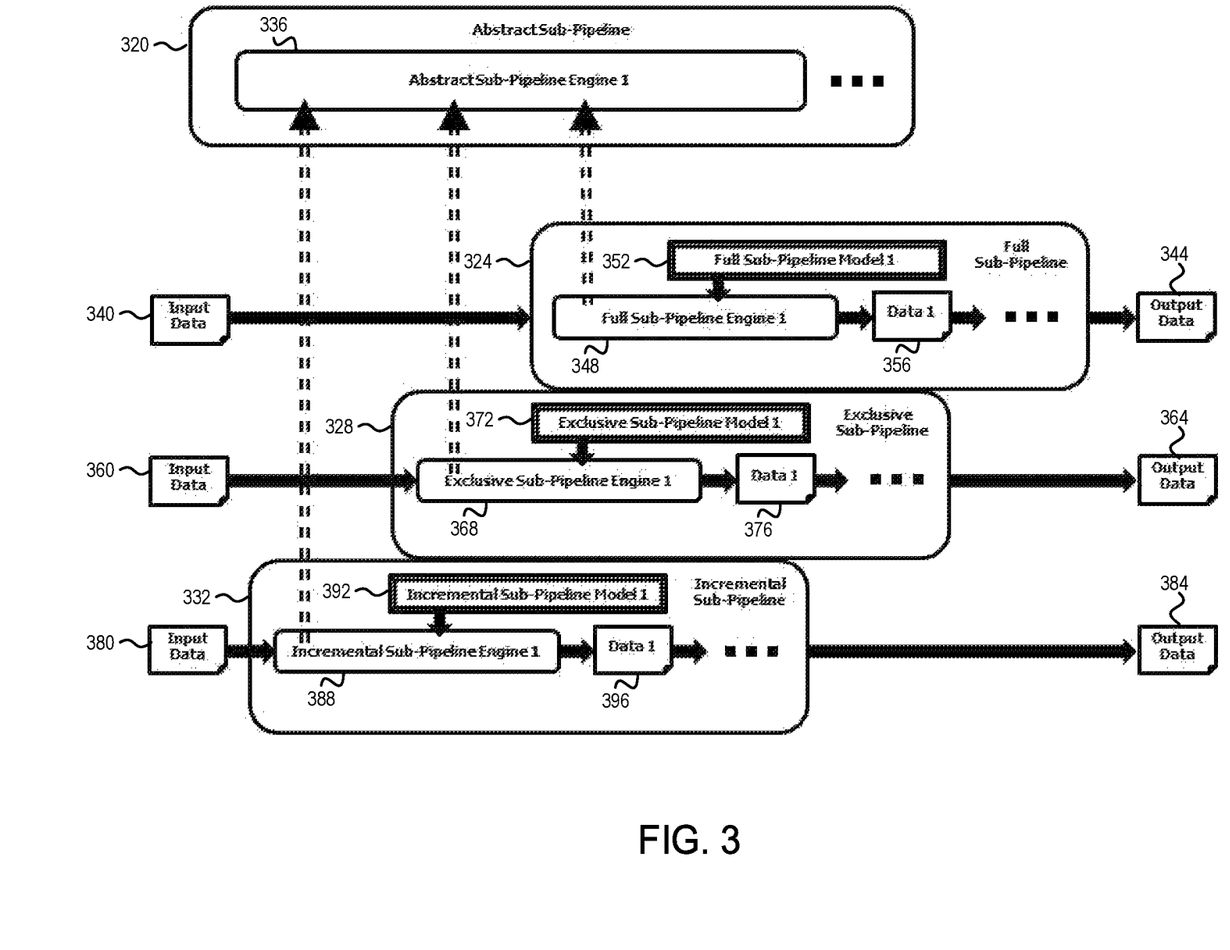
FIG. 3 is a schematic diagram illustrating a representative abstract sub-pipeline, a representative full sub-pipeline that extends the representative abstract sub-pipeline, a representative exclusive sub-pipeline that extends the representative abstract sub-pipeline, and a representative incremental sub-pipeline that extends the representative abstract sub-pipeline, in accordance with an embodiment of the present disclosure.

FIG. 3 is a schematic diagram illustrating a representative abstract sub-pipeline 320, a representative full sub-pipeline 324 that extends the representative abstract sub-pipeline 320, a representative exclusive sub-pipeline 328 that extends the representative abstract sub-pipeline 320, and a representative incremental sub-pipeline 332 that extends the representative abstract sub-pipeline 320, in accordance with an embodiment of the present disclosure. In the depicted example, the abstract sub-pipeline 320 includes an abstract sub-pipeline engine 336. In some other embodiments, the abstract sub-pipeline 320 includes a plurality of engines, coupled in series.

In the depicted example, the full sub-pipeline 324 is configured to receive full sub-pipeline input data 340 and to process the full sub-pipeline input data 340 into full sub-pipeline output data 344. Further, in the depicted example, the full sub-pipeline 324 includes a full sub-pipeline engine 348 and a full sub-pipeline model 352. In the depicted example, the full sub-pipeline engine 348 is configured to use the full sub-pipeline model 352 and processing rules to process the full sub-pipeline input data 340 into full sub-pipeline engine output data 356. Further, in the depicted example the full sub-pipeline engine 348 is an extension of the abstract sub-pipeline engine 336. In the depicted example, the full sub-pipeline 324 outputs the full sub-pipeline engine output data 356 as the full sub-pipeline output data 344. In some other embodiments, the full sub-pipeline 324 includes a plurality of engines and their respective models, with the engines coupled in series, and the full sub-pipeline 324 outputs the output data from the last engine of the series as the full sub-pipeline output data 344.

In the depicted example, the exclusive sub-pipeline 328 is configured to receive exclusive sub-pipeline input data 360 and to process the exclusive sub-pipeline input data 360 into exclusive sub-pipeline output data 364. Further, in the depicted example, the exclusive sub-pipeline 328 includes an exclusive sub-pipeline engine 368 and an exclusive sub-pipeline model 372. In the depicted example, the exclusive sub-pipeline engine 368 is configured to use the exclusive sub-pipeline model 372 and processing rules to process the exclusive sub-pipeline input data 360 into exclusive sub-pipeline engine output data 376. Further, in the depicted example the exclusive sub-pipeline engine 368 is an extension of the abstract sub-pipeline engine 336. In the depicted example, the exclusive sub-pipeline 328 outputs the exclusive sub-pipeline engine output data 376 as the exclusive sub-pipeline output data 364. In some other embodiments, the exclusive sub-pipeline 328 includes a plurality of engines and their respective models, with the engines coupled in series, and the exclusive sub-pipeline 328 outputs the output data from the last engine of the series as the exclusive sub-pipeline output data 364.

In the depicted example, the incremental sub-pipeline 332 is configured to receive incremental sub-pipeline input data 380 and to process the incremental sub-pipeline input data 380 into incremental sub-pipeline output data 384. Further, in the depicted example, the incremental sub-pipeline 332 includes an incremental sub-pipeline engine 388 and an incremental sub-pipeline model 392. In the depicted example, the incremental sub-pipeline engine 388 is configured to use the incremental sub-pipeline model 392 and processing rules to process the incremental sub-pipeline input data 380 into incremental sub-pipeline engine output data 396. Further, in the depicted example the incremental sub-pipeline engine 388 is an extension of the abstract sub-pipeline engine 336. In the depicted example, the incremental sub-pipeline 332 outputs the incremental sub-pipeline engine output data 396 as the incremental sub-pipeline output data 384. In some other embodiments, the incremental sub-pipeline 332 includes a plurality of engines and their respective models, with the engines coupled in series, and the incremental sub-pipeline 332 outputs the output data from the last engine of the series as the incremental sub-pipeline output data 384.

Figure 4:
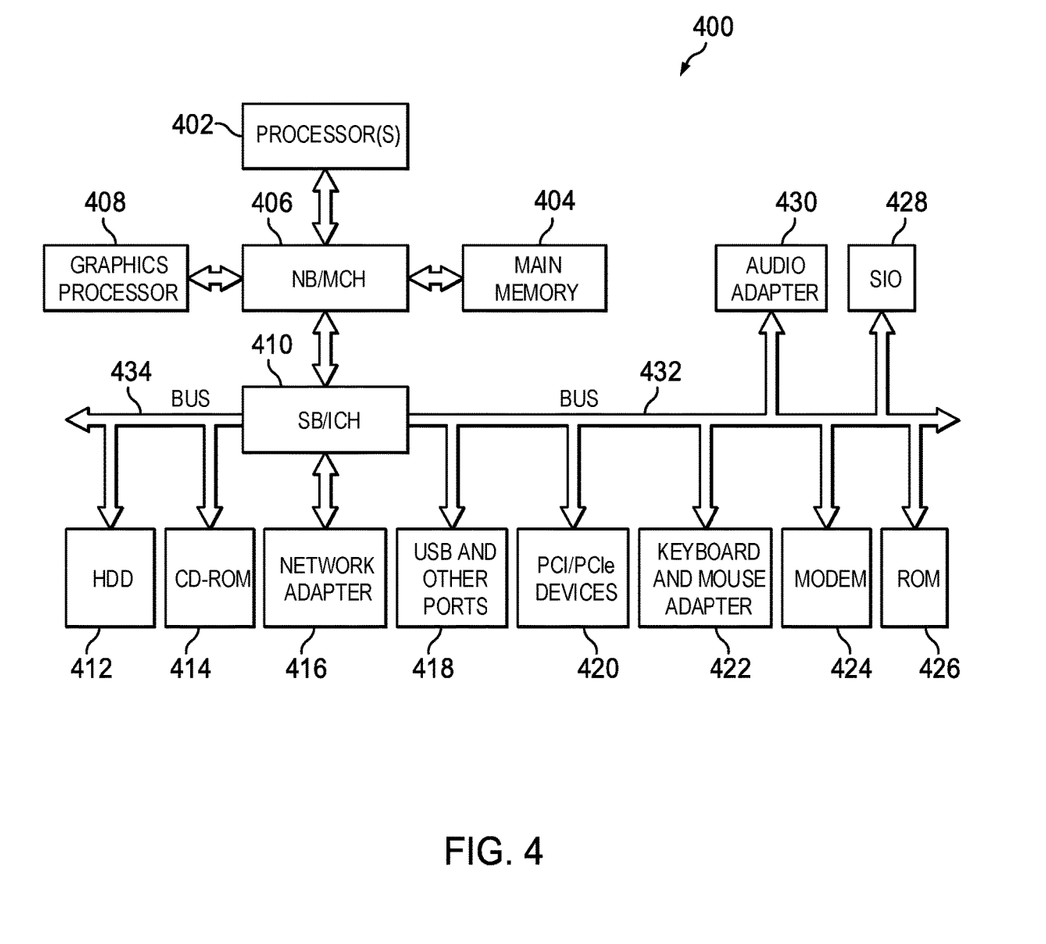
FIG. 4 is a block diagram illustrating a hardware architecture of a QA system according to an embodiment of the present disclosure.

FIG. 4 is a block diagram illustrating a hardware architecture of a system 400 according to an embodiment of the present disclosure in which aspects of the illustrative embodiments may be implemented. For example, in one embodiment, the QA system 10 (depicted in FIG. 1) may be implemented using the data processing system 400. Additionally, the data processing system 400 may be configured to store and execute instructions for performing the method 500 illustrated in FIG. 5 (described below) as well as the other processes described herein. In the depicted example, the data processing system 400 employs a hub architecture including north bridge and memory controller hub (NB/MCH) 406 and south bridge and input/output (I/O) controller hub (SB/ICH) 410. Processor(s) 402, main memory 404, and graphics processor 408 are connected to NB/MCH 406. Graphics processor 408 may be connected to NB/MCH 406 through an accelerated graphics port (AGP). A computer bus, such as bus 432 or bus 434, may be implemented using any type of communication fabric or architecture that provides for a transfer of data between different components or devices attached to the fabric or architecture.

In the depicted example, network adapter 416 connects to SB/ICH 410. Audio adapter 430, keyboard and mouse adapter 422, modem 424, read-only memory (ROM) 426, hard disk drive (HDD) 412, compact disk read-only memory (CD-ROM) drive 414, universal serial bus (USB) ports and other communication ports 418, and peripheral component interconnect/peripheral component interconnect express (PCI/PCIe) devices 420 connect to SB/ICH 410 through bus 432 and bus 434. PCI/PCIe devices may include, for example, Ethernet adapters, add-in cards, and personal computing (PC) cards for notebook computers. PCI uses a card bus controller, while PCIe does not. ROM 426 may be, for example, a flash basic input/output system (BIOS). Modem 424 or network adapter 416 may be used to transmit and receive data over a network.

HDD 412 and CD-ROM drive 414 connect to SB/ICH 410 through bus 434. HDD 412 and CD-ROM drive 414 may use, for example, an integrated drive electronics (IDE) or serial advanced technology attachment (SATA) interface. In some embodiments, HDD 412 may be replaced by other forms of data storage devices including, but not limited to, solid-state drives (SSDs). A super I/O (SIO) device 428 may be connected to SB/ICH 410. SIO device 428 may be a chip on the motherboard that is configured to assist in performing less demanding controller functions for the SB/ICH 410 such as controlling a printer port, controlling a fan, and/or controlling the small light emitting diodes (LEDS) of the data processing system 400.

The data processing system 400 may include a single processor 402 or may include a plurality of processors 402. Additionally, processor(s) 402 may have multiple cores. For example, in one embodiment, data processing system 400 may employ a large number of processors 402 that include hundreds or thousands of processor cores. In some embodiments, the processors 402 may be configured to perform a set of coordinated computations in parallel.

An operating system is executed on the data processing system 400 using the processor(s) 402. The operating system coordinates and provides control of various components within the data processing system 400 in FIG. 4. Various applications and services may run in conjunction with the operating system. Instructions for the operating system, applications, and other data are located on storage devices, such as one or more HDD 412, and may be loaded into main memory 404 for execution by processor(s) 402. In some embodiments, additional instructions or data may be stored on one or more external devices. The processes described herein for the illustrative embodiments may be performed by processor(s) 402 using computer usable program code, which may be located in a memory such as, for example, main memory 404, ROM 426, or in one or more peripheral devices.

Figure 5:
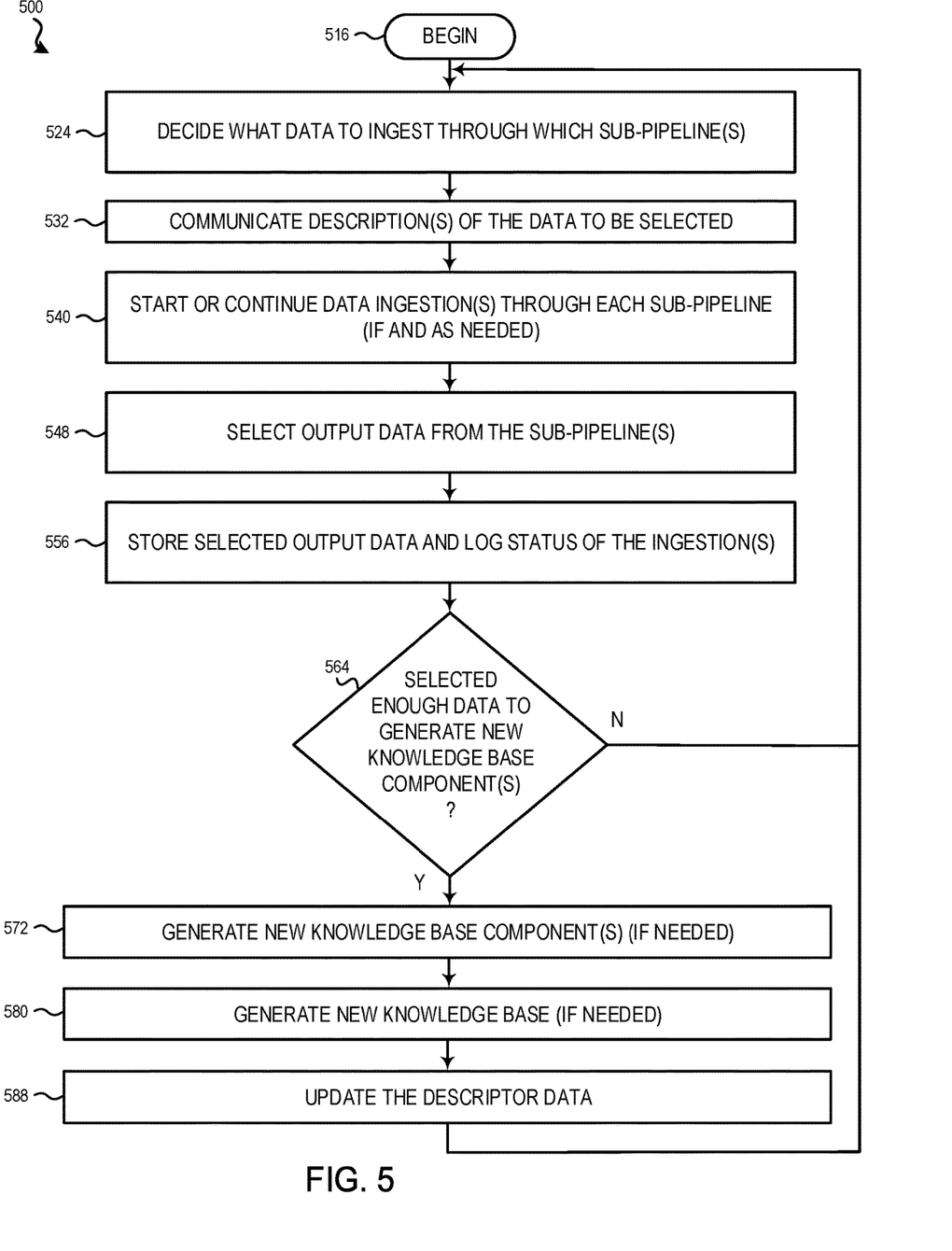
FIG. 5 is a flowchart illustrating a method for documents data ingestion in accordance with an embodiment of the present disclosure.

FIG. 5 is a flowchart illustrating a method 500 for documents data ingestion in accordance with an embodiment of the present disclosure. In accordance with aspects of the present disclosure, the method 500 may be performed by the QA system 10 (depicted in FIG. 1). While the following description of the method 500 is made with reference to operations and components of the QA system 10 (which includes the ingestion pipeline 100), it should be appreciated that the method 500 and/or any one or more of the particular steps of the method 500 may be performed by any other suitable device or system.

At step 516, the ingestion pipeline 100 generally initiates operations (e.g., when a user powers-up or resets/reboots the QA system 10).

At step 524, the ingestion pipeline 100 decides what document data records to ingest through which of its sub-pipelines. More particularly, in the depicted example, in step 524 the sub-pipeline input filter module 212 and/or the other sub-pipeline input filter module(s) of the ingestion pipeline 100 apply the FILTERING RULES (described above).

At step 532, the sub-pipeline input filter module 212 and/or the other sub-pipeline input filter module(s) of the ingestion pipeline 100 communicate the descriptor data (generated/updated by application of the FILTERING RULES, described above) to the selector modules (e.g., the knowledge graph output selector module 216, the search index output selector module 220, and the NLP output selector module 224).

At step 540, the ingestion pipeline 100 starts new/additional ingestion(s) of the analyzed input documents data 104, the filtered input documents data 108, and/or the incremental documents data 112 through its sub-pipelines as permitted/dictated by the sub-pipeline input filter module 212 and/or the other sub-pipeline input filter module(s) according to their application of the FILTERING RULES (to whatever extent the ingestion pipeline 100 has not already started such ingestions and/or needs to start one or more new/additional ingestions), and continues (concurrently, in parallel) any ingestion(s) of the analyzed input documents data 104, the filtered input documents data 108, and/or the incremental documents data 112 that it has previously started but not yet completed.

At step 548, the ingestion pipeline 100 selects output data for the QA system 10 to use in generating one or more of the components (e.g., the knowledge graph 120, the SOLR index collection 124, and/or the NLP data 128) of the knowledge base 116. More particularly, in the depicted example, in step 548 the knowledge graph output selector module 216, the search index output selector module 220, and the NLP output selector module 224 each apply the SELECTION RULES (described above) to select the particular document data records from their respective available input data.

At step 556, the ingestion pipeline 100 stores and catalogs the output data for the QA system 10 to use in generating the component(s) (e.g., the knowledge graph 120, the SOLR index collection 124, and/or the NLP data 128) of the knowledge base 116. More particularly, in the depicted example, in step 556 the knowledge graph output selector module 216, the search index output selector module 220, and the NLP output selector module 224 store and catalog the selections that they made in step 548 (described above).

At step 564, the ingestion pipeline 100 determines whether it has processed enough data for the QA system 10 to go ahead and generate one or more components of the knowledge base 116. More particularly, in the depicted example, in step 564 the knowledge graph output selector module 216 determines whether it has selected enough data for the QA system 10 to generate the knowledge graph 120, the search index output selector module 220 determines whether it has selected enough data for the QA system 10 to generate the SOLR index collection 124, and NLP output selector module 224 determines whether it has selected enough data for the QA system 10 to generate the NLP data 128. And, more particularly, in the depicted example, in step 564 each of the knowledge graph output selector module 216, the search index output selector module 220, and the NLP output selector module 224 compares the document data records that it has selected to the descriptor data to determine whether it has received and selected from all of the document data records intended for it. Further, in the depicted example, if in step 564 the ingestion pipeline 100 determines that it has indeed processed enough data for the QA system 10 to generate one or more components of the knowledge base 116, then operations of the QA system 10 proceed to step 572 (described below); otherwise, operations of the QA system 10 return to step 524 (described above).

At step 572, the QA system 10 generates and/or updates each of the components of the knowledge base 116 (e.g., the knowledge graph 120, the SOLR index collection 124, and/or the NLP data 128) for which the ingestion pipeline 100 has determined (in step 564, described above) that it has processed enough data.

At step 580, the QA system 10 uses the new/updated components of the knowledge base 116 (e.g., the knowledge graph 120, the SOLR index collection 124, and/or the NLP data 128) to generate or update the knowledge base 116.

At step 588, the knowledge graph output selector module 216, the search index output selector module 220, and the NLP output selector module 224 update the descriptor data to indicate that the document data record(s) selected for use in that generation or update of the knowledge base 116 have been used to generate/update the knowledge base 116 and, thus, are no longer (for the time being) currently selected. In the depicted example, after step 588, operations of the QA system 10 return to step 524 (described above).

It should be appreciated that aspects of the present disclosure provide capabilities to independently modify one or more sub-pipeline models and/or independently add or remove one or more sub-pipelines or even one or more entire features of an ingestion pipeline and then generate one or more new/updated knowledge bases from a subset of the corpus of documents data from which a previous knowledge base was generated (without necessarily re-ingesting the entire corpus), and aspects provide capabilities to "chain re-ingest" data (described below) as well. As an example of some of the capabilities provided by aspects of the present disclosure, suppose that a user would like for the depicted example QA system 10 to generate a knowledge base based on a particular corpus of 100 million documents, and further suppose that 60% into the ingestion of the 100 million documents (i.e., at a point at which the ingestion pipeline 100 has ingested the first 600,000 document data records through its full sub-pipelines), the user determines that the full SIRE relationships sub-pipeline 140 has contributed undesirable data to the generation of the knowledge graph 120. Further suppose that (to address the problem) the user or a developer specifies which particularly entries in the knowledge graph 120 need to be fixed. The sub-pipeline input filter module 212 applies the FILTERING rules (including reading the new/updated requirements for the knowledge graph 120) to determine the filtered input documents data 108, and updates the descriptor data accordingly. In this example case, the NLP feature 172 and the full sub-pipelines of the SIRE feature 132 continue ingesting the remaining 400,000 document data records, but (absent another sub-pipeline model change or a change in the analyzed input documents data 104) they will not need to re-ingest the entire corpus. In this example case, further supposing that the filtered input documents data 108 comprises a number of document data records that is less than whatever THRESHOLD the user has set, the example QA system 10 will only need to ingest the material/affected subset of the corpus (i.e., the filtered input documents data 108) through the exclusive SIRE CORE sub-pipeline 148 and the exclusive SIRE relationships sub-pipeline 152. The knowledge graph output selector module 216 will apply the SELECTION RULES to select the appropriate data to provide to the QA system 10 for regenerating/updating the knowledge graph 120. It should be appreciated that other embodiments of the QA system 10 may, in cases like this example case (in which an exclusive sub-pipeline, in this example case, namely, the exclusive SIRE relationships sub-pipeline 152, would otherwise receive its sub-pipeline input data from an exclusive sub-pipeline, in this example case, namely the exclusive SIRE CORE sub-pipeline 148, that is associated with a full sub-pipeline for which there has not been a sub-pipeline input data or a sub-pipeline model change, in this case, namely, the full SIRE CORE sub-pipeline 136) employ pointers or other data redirection techniques (such as, for a case like this example case, having the exclusive SIRE CORE sub-pipeline 148 obtain it its sub-pipeline output data by pointing to the sub-pipeline output data of the full SIRE CORE sub-pipeline 136 rather than by actually processing the corresponding sub-pipeline input data).

Next, expanding on the previous example, suppose that the depicted example QA system 10 has progressed to a point at which the ingestion pipeline 100 has ingested 800,000 or so of the document data records through its full sub-pipelines (and has also re-ingested a subset of those as a result of the change to the requirements for the knowledge graph 120), and then the user updates a Concepts Detector Dictionary (e.g., by adding, correcting and removing some entries), which, for example, happens to be a model in the full concepts sub-pipeline 180. The sub-pipeline input filter module 212 and/or the other sub-pipeline input filter module(s) apply the FILTERING rules anew to determine (anew) the filtered input documents data 108, and update the descriptor data accordingly. Here, operations of the entire SIRE feature 132 and the full sub-pipelines and incremental sub-pipelines of the NLP feature 172 are unaffected and, further supposing that that the new filtered input documents data 108 comprises a number of document data records that is less than the user-specified THRESHOLD, the example QA system 10 will only need to re-ingest the material/affected subset of the corpus (i.e., the new filtered input documents data 108) through the exclusive NLP content server sub-pipeline 188 and exclusive concepts sub-pipeline 192. And the search index output selector module 220 will apply the SELECTION RULES to select the appropriate data to provide to the QA system 10 for generation of a corresponding new/updated version of the SOLR index collection 124. It should be appreciated that other embodiments of the QA system 10 may, in cases like this expanded example case (in which an exclusive sub-pipeline, in this expanded example case, namely, the exclusive concepts sub-pipeline 192, would otherwise receive its sub-pipeline input data from an exclusive sub-pipeline, in this example case, namely the exclusive NLP content server sub-pipeline 188, that is associated with a full sub-pipeline for which there has not been a sub-pipeline input data or a sub-pipeline model change, in this case, namely, the full NLP content server sub-pipeline 176) employ pointers or other data redirection techniques (such as, for a case like this expanded example case, having the exclusive NLP content server sub-pipeline 188 obtain it its sub-pipeline output data by pointing to the sub-pipeline output data of the full NLP content server sub-pipeline 176 rather than by actually processing the corresponding sub-pipeline input data). This expanded example demonstrates one instance of the "chain re-ingestion" capabilities provided by aspects of the present disclose, during which the output selector modules may store data for and catalog the progress of multiple ingestions/re-ingestions that are performed concurrently, in parallel.

Expanding on the example a bit further, suppose that a developer later removes the full SIRE entities sub-pipeline 144, the exclusive SIRE entities sub-pipeline 156, and the incremental SIRE entities sub-pipeline 168. In response, the search index output selector module 220 deselects any previously selected sub-pipeline output data from those sub-pipelines and the QA system 10 generates corresponding new/updated versions of the SOLR index collection 124 and the knowledge base 116. Or, expanding on the example even further, suppose that a developer latter replaces the NLP feature 172 with a new/updated version of that feature. In response: the search index output selector module 220 deselects any previously selected sub-pipeline output data from the full concepts sub-pipeline 180, the exclusive concepts sub-pipeline 192, the incremental concepts sub-pipeline 204, the full syntactic relationships sub-pipeline 184, the exclusive syntactic relationships sub-pipeline 196, and the incremental syntactic relationships sub-pipeline 208; the NLP output selector module 224 deselects any previously selected sub-pipeline output data from the full NLP content server sub-pipeline 176, the exclusive NLP content server sub-pipeline 188, and the incremental NLP content server sub-pipeline 200; the search index output selector module 220 and the NLP output selector module 224 select the new sub-pipeline output data from the new/replacement sub-pipelines; the QA system 10 generates a corresponding new/updated version of the SOLR index collection 124 and a corresponding new/updated version of the NLP data 128; and the QA system 10 generates a new/updated version of the knowledge base 116.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for documents data ingestion, the method comprising:
   ingesting a plurality of input documents by a first full sub-pipeline of an ingestion pipeline to extract first relationship data and first entities data for building a knowledge base;
   applying, by the ingestion pipeline, a filtering rule to the plurality of input documents to generate a filtered documents subset of the plurality of input documents;
   ingesting the filtered documents subset of the plurality of input documents by a first exclusive sub-pipeline of the ingestion pipeline to extract second relationship data and second entities data;
   inputting the first relationship data and the second relationship data into a knowledge graph selector;
   selecting, by the knowledge graph selector, first data records from the first relationship data and the second relationship data based on a first set of selection rules for building a knowledge graph of the knowledge base;
   inputting the first entities data and the second entities data into a search index selector; and
   selecting, by the search index selector, second data records from the first entities data and the second entities data based on a second set of selection rules for building an index collection of the knowledge base.

2. The method of claim 1, further comprising:
   ingesting the plurality of input documents by a second full sub-pipeline of the ingestion pipeline to extract first concept data for building the knowledge base;
   inputting the first concept data into the search index selector; and
   selecting, by the search index selector, the second data records from the first entities data, the second entities data, and the first concept data based on the second set of selection rules for building the index collection of the knowledge base.

3. The method of claim 1, wherein ingesting the plurality of input documents by the first full sub-pipeline and ingesting the filtered documents subset of the plurality of input documents by the first exclusive sub-pipeline are performed concurrently and in parallel.

4. The method of claim 1, wherein the filtered documents subset of the plurality of input documents comprises of a number of documents below a predetermined threshold of the plurality of input documents for processing by the first exclusive sub-pipeline of the ingestion pipeline.

5. The method of claim 2, further comprising:
ingesting the plurality of input documents by the second full sub-pipeline of the ingestion pipeline to extract third relationship data for building the knowledge base;
inputting the third relationship data into the search index selector; and
selecting, by the search index selector, the second data records from the first entities data, the second entities data, the first concept data, and the third relationship data based on the second set of selection rules for building the index collection of the knowledge base.

6. The method of claim 5, further comprising:
ingesting the filtered documents subset of the plurality of input documents by a second exclusive sub-pipeline of the ingestion pipeline to extract fourth relationship data;
inputting the fourth relationship data into the search index selector; and
selecting, by the search index selector, the second data records from the first entities data, the second entities data, the first concept data, the third relationship data, and the fourth relationship data based on the second set of selection rules for building the index collection of the knowledge base.

7. The method of claim 1, further comprising extending an abstract sub-pipeline to create both the first full sub-pipeline and the first exclusive sub-pipeline of the ingestion pipeline.

8. The method of claim 1, further comprising modifying a sub-pipeline of the ingestion pipeline without disrupting the documents data ingestion of other sub-pipelines of the ingestion pipeline.

9. The method of claim 8, wherein modifying the sub-pipeline of the ingestion pipeline comprises modifying a sub-pipeline model of the sub-pipeline.

10. The method of claim 8, wherein modifying the sub-pipeline comprises modifying, adding, or removing an engine of the sub-pipeline.

11. The method of claim 8, wherein modifying the sub-pipeline comprises adding or removing the sub-pipeline to the ingestion pipeline.

12. A system for documents data ingestion, the system comprising:
a memory having instructions therein; and
at least one processor in communication with the memory, wherein the at least one processor is configured to execute the instructions to:
ingest a plurality of input documents by a first full sub-pipeline of an ingestion pipeline to extract first relationship data and first entities data for building a knowledge base;
apply, by the ingestion pipeline, a filtering rule to the plurality of input documents to generate a filtered documents subset of the plurality of input documents;
ingest the filtered documents subset of the plurality of input documents by a first exclusive sub-pipeline of the ingestion pipeline to extract second relationship data and second entities data;
input the first relationship data and the second relationship data into a knowledge graph selector;
select, by the knowledge graph selector, first data records from the first relationship data and the second relationship data based on a set of selection rules for building a knowledge graph of the knowledge base;
input the first entities data and the second entities data into a search index selector; and
select, by the search index selector, second data records from the first entities data and the second entities data based on a second set of selection rules for building an index collection of the knowledge base.

13. The system of claim 12, wherein the at least one processor is further configured to execute the instructions to:
ingest the plurality of input documents by a second full sub-pipeline of the ingestion pipeline to extract first concept data for building the knowledge base;
input the first concept data into the search index selector; and
select, by the search index selector, the second data records from the first entities data, the second entities data, and the first concept data based on the second set of selection rules for building the index collection of the knowledge base.

14. The system of claim 13, wherein the at least one processor is further configured to execute the instructions to:
ingest the plurality of input documents by the second full sub-pipeline of the ingestion pipeline to extract third relationship data for building the knowledge base;
input the third relationship data into the search index selector; and
select, by the search index selector, the second data records from the first entities data, the second entities data, the first concept data, and the third relationship data based on the second set of selection rules for building the index collection of the knowledge base.

15. The system of claim 12, wherein the at least one processor is further configured to execute the instructions to generate the filtering rule based on undesirable data from the knowledge base.

16. The system of claim 12, wherein the at least one processor is further configured to execute the instructions to extend an abstract sub-pipeline to create both the full sub-pipeline and the exclusive sub-pipeline of the ingestion pipeline.

17. The system of claim 12, wherein the at least one processor is further configured to execute the instructions to modify a sub-pipeline of the ingestion pipeline without disrupting the documents data ingestion of other sub-pipelines of the ingestion pipeline.

18. A computer program product for documents data ingestion, the computer program product comprising a computer readable storage medium having program instructions embodied therewith, the program instructions executable by at least one processor to cause the at least one processor to:
ingest a plurality of input documents by a first full sub-pipeline of an ingestion pipeline to extract first relationship data and first entities data for building a knowledge base;
apply, by the ingestion pipeline, a filtering rule to the plurality of input documents to generate a filtered documents subset of the plurality of input documents;

ingest the filtered documents subset of the plurality of input documents by a first exclusive sub-pipeline of the ingestion pipeline to extract second relationship data and second entities data;

input the first relationship data and the second relationship data into a knowledge graph selector;

select, by the knowledge graph selector, first data records from the first relationship data and the second relationship data based on a set of selection rules for building a knowledge graph of the knowledge base;

input the first entities data and the second entities data into a search index selector; and select, by the search index selector, second data records from the first entities data and the second entities data based on a second set of selection rules for building an index collection of the knowledge base.

19. The computer program product of claim 18, wherein the program instructions executable by at least one processor further comprises instructions to:

ingest the plurality of input documents by a second full sub-pipeline of the ingestion pipeline to extract first concept data for building the knowledge base;

input the first concept data into the search index selector; and select, by the search index selector, the second data records from the first entities data, the second entities data, and the first concept data based on the second set of selection rules for building the index collection of the knowledge base.

20. The computer program product of claim 18, wherein the program instructions executable by at least one processor further comprises instructions to generate the filtering rule based on undesirable data from the knowledge base.

* * * * *